US012784337B2

(12) United States Patent
Chai et al.

(10) Patent No.: US 12,784,337 B2
(45) Date of Patent: Nov. 3, 2026

(54) VIRTUAL OBJECT MARKING METHOD AND APPARATUS, AND STORAGE MEDIUM

(71) Applicant: Tencent Technology (Shenzhen) Company Limited, Shenzhen (CN)

(72) Inventors: Ruobing Chai, Shenzhen (CN); Long He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 449 days.

(21) Appl. No.: 18/125,580

(22) Filed: Mar. 23, 2023

(65) Prior Publication Data

US 2023/0230315 A1 Jul. 20, 2023

Related U.S. Application Data

(63) Continuation of application No. PCT/CN2022/094378, filed on May 23, 2022.

(30) Foreign Application Priority Data

Jun. 10, 2021 (CN) ......................... 202110648470.9

(51) Int. Cl.
*G06T 17/00* (2006.01)
*G06F 3/04842* (2022.01)
(Continued)

(52) U.S. Cl.
CPC .......... *G06T 17/00* (2013.01); *G06F 3/04842* (2013.01); *G06F 3/0488* (2013.01); *G06T 7/70* (2017.01); *G06V 10/761* (2022.01)

(58) Field of Classification Search
None
See application file for complete search history.

(56) References Cited

U.S. PATENT DOCUMENTS

2015/0149384 A1* 5/2015 Zhou ...................... G06Q 30/02 705/347
2017/0308268 A1* 10/2017 Chiba ................ G06F 3/04817
(Continued)

FOREIGN PATENT DOCUMENTS

CN 106924970 A 7/2017
CN 109847353 A 6/2019
(Continued)

OTHER PUBLICATIONS

Tencent Technology, WO, PCT/CN2022/094378, Aug. 29, 2022, 5 pgs.
(Continued)

*Primary Examiner* — Yi Wang
(74) *Attorney, Agent, or Firm* — Morgan, Lewis & Bockius LLP

(57) ABSTRACT

Embodiments of this application relate to the field of Internet technologies and provide a virtual object marking method and apparatus. The method is performed by an electronic device acting as a first terminal and includes: displaying a scene picture of a virtual scene; in response to an aiming operation performed on a target virtual object in the scene picture of the virtual scene by a first virtual object in the virtual scene controlled by the first terminal using a virtual sight, displaying description information of the target virtual object in the scene picture of the virtual scene; and in response to a selection operation performed on the description information, displaying marking information of the target virtual object in the scene picture of the virtual scene, the marking information indicating a position of the target virtual object in the virtual scene.

20 Claims, 12 Drawing Sheets

(51) Int. Cl.

| | |
|---|---|
| ***G06F 3/0488*** | (2022.01) |
| ***G06T 7/70*** | (2017.01) |
| ***G06V 10/74*** | (2022.01) |

(56) References Cited

U.S. PATENT DOCUMENTS

| | | | | |
|---|---|---|---|---|
| 2018/0098059 | A1* | 4/2018 | Valdivia | G06F 3/0482 |
| 2020/0330866 | A1* | 10/2020 | Yang | A63F 13/2145 |
| 2020/0338449 | A1 | 10/2020 | Fan | |

FOREIGN PATENT DOCUMENTS

| | | | | |
|---|---|---|---|---|
| CN | 110270098 | A | 9/2019 | |
| CN | 111097171 | A | 5/2020 | |
| CN | 111773705 | A | 10/2020 | |
| CN | 113209617 | A | 8/2021 | |
| CN | 111097171 | B | 3/2022 | |
| WO | WO-2019218815 | A1 * | 11/2019 | A63F 13/2145 |

OTHER PUBLICATIONS

Tencent Technology, IPRP, PCT/CN2022/094378, Nov. 21, 2023, 6 pgs.

Tencent Technology, ISR, PCT/CN2022/094378, Aug. 29, 2022, 2 pgs.

Tencent Technology, Japanese Office Action, JP Patent Application No. 2023553001, Jun. 27, 2024, 10 pgs.

* cited by examiner

VIRTUAL OBJECT MARKING METHOD AND APPARATUS, AND STORAGE MEDIUM

CROSS-REFERENCE TO RELATED APPLICATION

This application is a continuation application of PCT Patent Application No. PCT/CN2022/094378, entitled "VIRTUAL OBJECT MARKING METHOD AND APPARATUS, AND STORAGE MEDIUM" filed on May 23, 2022, which claims priority to Chinese Patent Application No. 202110648470.9, filed with the Chinese Patent Office on Jun. 10, 2021, and entitled "VIRTUAL OBJECT MARKING METHOD AND APPARATUS", all of which are incorporated herein by reference in their entirety.

FIELD OF THE TECHNOLOGY

Embodiments of this application relate to the field of Internet technologies, and in particular, to a virtual object marking method and apparatus, and a storage medium.

BACKGROUND OF THE DISCLOSURE

Team vs team (hereinafter referred to as team battle) games are widely welcomed by players at present. In a game scene of a team battle game, a player who finds a game item shares the position of the game item with other players (i.e., teammates of the player) of the player team by marking the game item.

SUMMARY

An embodiment of this application provides a virtual object marking method, performed by an electronic device acting as a first terminal and including:

displaying a scene picture of a virtual scene;

in response to an aiming operation performed on a target virtual object in the scene picture of the virtual scene by a first virtual object in the virtual scene controlled by the first terminal using a virtual sight, displaying description information of the target virtual object in the scene picture of the virtual scene; and in response to a selection operation performed on the description information, displaying marking information of the target virtual object in the scene picture of the virtual scene, the marking information indicating a position of the target virtual object in the virtual scene.

An embodiment of this application provides an electronic device, used as a first terminal and including a processor and a memory, the memory storing at least one instruction, at least one program, a code set or an instruction set, and the at least one instruction, the at least one program, the code set or the instruction set being loaded and executed by the processor to perform the virtual object marking method according to a first aspect.

An embodiment of this application provides a non-transitory computer-readable storage medium, storing at least one instruction, at least one program, a code set, or an instruction set, the at least one instruction, the at least one program, the code set or the instruction set being loaded and executed by a processor to perform the virtual object marking method according to the first aspect.

BRIEF DESCRIPTION OF THE DRAWINGS

To describe technical solutions in embodiments of this application more clearly, the following briefly describes the accompanying drawings required for embodiments of this application. It is to be understood that, for persons of ordinary skill in the art, other drawings may be obtained according to these accompanying drawings without creative efforts.

DESCRIPTION OF EMBODIMENTS

The following describes technical solutions in embodiments of this application with reference to the accompanying drawings in embodiments of this application.

Terms used in the following embodiments of this application are only intended to describe particular embodiments, and are not intended to limit the technical solutions of this application. As used in this specification and the claims of this application, a singular expression form, "one", "a", "said", "foregoing", "the", or "this", is intended to also include a plural expression form, unless clearly indicated to the contrary in the context.

Related technologies in embodiments of this application are described below.

1. Virtual Scene

Virtual scene is a virtual scene displayed (or provided) when a game application is run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene. In some embodiments, the virtual scene may include a virtual object.

2. Virtual Object

Virtual object refers to a movable object in a virtual scene. The movable object may be at least one of a virtual character, a virtual animal, a virtual vehicle, and a virtual item. In some embodiments, when the virtual scene is a three-dimensional virtual scene, the virtual object is a three-dimensional model created based on a skeletal animation technology. Each virtual object has a shape, a volume and an orientation in the three-dimensional virtual scene, and occupies some space in the three-dimensional virtual scene.

A scene picture of a virtual scene may be continuously updated with movements of a virtual object controlled by a terminal corresponding to the virtual scene. The scene picture of the virtual scene may be a picture from a perspective of a corresponding virtual object. The movements of the virtual object may include: adjusting body posture, crawling, walking, running, riding, flying, jumping, aiming with a virtual sight, shooting, driving, picking, attacking, throwing, releasing a skill, etc.

In some embodiments, during running of a game application, a virtual scene may be rendered by a server, and then transmitted to a terminal to display the virtual scene by hardware (e.g., a screen) of the terminal.

Figure 1:
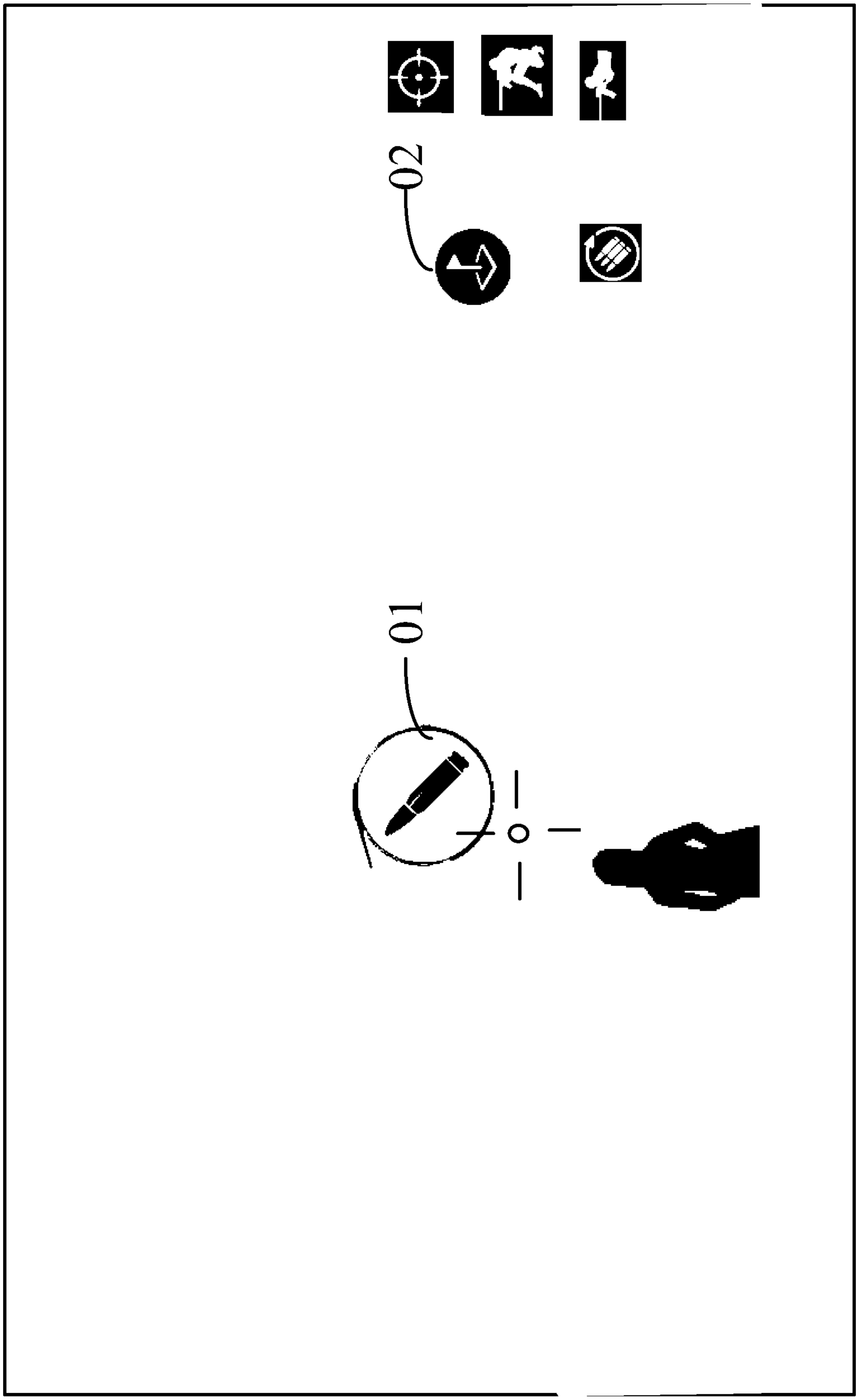
FIG. 1 is a schematic diagram of an example scenario for marking a game item according to an embodiment of this application.

FIG. 1 shows a commonly used method for marking a game item. In the method, after aiming at a game item 01 through a virtual aim point, a player marks the game item by tapping an identifier icon 02. However, since a game scene contains multiple game items, players are likely to mistake the game items aimed at, resulting in mistakes in marking, that is, the game items actually marked by players are not the game items that players want to mark. Consequently, the game experience of players is poor.

The embodiment of this application provides a virtual object marking method, which can not only avoid a mistake in marking, but also improve convenience for marking a target virtual object.

Figure 2:
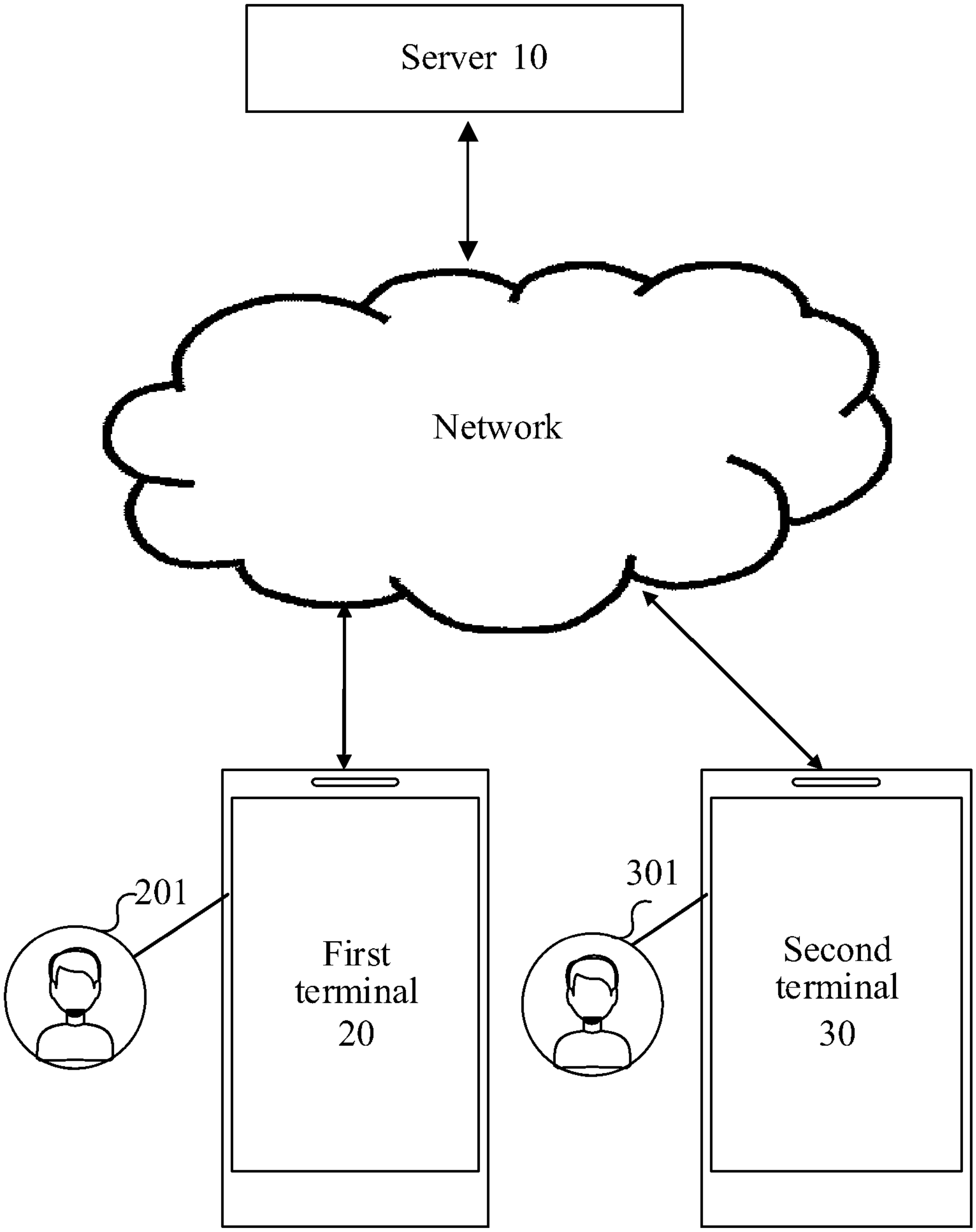
FIG. 2 is a schematic diagram of an example architectural of a game application running system according to an embodiment of this application.

FIG. 2 is a schematic diagram of an example architecture of a virtual object marking system according to the embodiment of this application to which the virtual object marking method according to the embodiment of this application is applicable. The virtual object marking system may be a game application running system running a game. The virtual object marking system includes: a server 10, a first terminal 20, and a second terminal 30.

It can be understood that FIG. 2 merely provides a schematic description and does not limit the virtual object marking system according to the embodiment of this application. In an actual implementation, the virtual object marking system according to the embodiment of this application may further include more or fewer devices. This is not limited in embodiments of this application.

The server 10 may include at least one of a server, a server cluster composed of a plurality of servers, a cloud computing platform, and a virtualization center. The server 10 may be configured to run an application, such as a game application, to provide computing resources for the running of the application and process logic related to all configurations and parameters of the game, including providing for the running of the application basic cloud computing services such as a database, a function, storage, a network service, communication, a middleware service, a domain name service, a security service, a content delivery network (CDN), big data, and an artificial intelligence (AI) platform. For example, the server 10 may receive an operation request from a terminal, perform a corresponding operation event on an application based on the operation request, render three-dimensional virtual environments corresponding to the application, and transmit the rendered virtual environments to the terminal, so that the terminal displays the corresponding virtual environments.

The first terminal 20 and the second terminal 30 may be embodied as electronic devices such as mobile phones, tablet computers, game consoles, e-book readers, multimedia players, wearable devices, or personal computers (PCs). The device types of the first terminal 20 and the second terminal 30 are the same or different. This is not limited here. The first terminal 20 and the second terminal 30 may have an application client of the forgoing application installed and run thereon and display a scene picture of a virtual scene corresponding to the application, for example, have a game application installed and run thereon and display a scene picture of a virtual scene corresponding to the corresponding game. In an actual implementation scenario, the application client may be a game client. The game client may be a three-dimensional game client or a two-dimensional game client. When the game client is a two-dimensional game client, a virtual object in a scene picture of a virtual scene displayed by a terminal may be a two-dimensional model. When the game client is a three-dimensional game client, a virtual object in a scene picture of a virtual scene displayed by a terminal may be a three-dimensional model. In the following embodiment of this application, a description is provided by taking the virtual scene being a three-dimensional virtual scene as an example.

The virtual scenes displayed by the first terminal 20 and the second terminal 30 are rendered and transmitted by the server 10, respectively. In some embodiments, the first terminal 20 and the second terminal 30 may display identical or different virtual scenes of a same application through different application clients, for example, display identical or different virtual scenes of a same game through different game clients. On this basis, the virtual scene displayed by the first terminal 20 and the virtual scene displayed by the second terminal 30 may be a same kind. For example, the virtual scene displayed by the first terminal 20 and the virtual scene displayed by the second terminal 30 may be different virtual scenes corresponding to a shooting game.

For example, the first terminal 20 is a terminal used by a first player 201. The first player 201 may use the first terminal 20 to control a first virtual role in the virtual scene to move. In this case, the first terminal 20 displays a scene picture from a perspective of the first virtual role to the first player 201. The second terminal 30 is a terminal used by a second player 301. The second player 301 may use the second terminal 30 to control a second virtual role in the virtual scene to move. In this case, the second terminal 30 displays a scene picture from a perspective of the second virtual role to the second player 301. The first virtual role and the second virtual role may be first virtual characters, such as simulation characters or cartoon characters, or may be virtual items, such as blocks or marbles.

In some embodiments, in response to receiving an operation of a corresponding player, either of the first terminal 20 and the second terminal 30 may transmit to the server 10 request information corresponding to the corresponding operation, so that the server 10 performs an event corresponding to the corresponding operation and renders a corresponding scene picture.

In some embodiments, there may be a direct connection or an indirect connection between the server 10 and the first terminal 20 and between the server 10 and the second terminal 30 via a wired network or a wireless network. This is not limited in embodiments of this application.

FIG. 2 is a schematic diagram of a logical functional level. In an actual implementation, the server 10 may include at least one server device entity, and the first terminal 20 and the second terminal 30 may be any two of a plurality of terminal device entities connected to the server 10. Details are not described in the embodiment of this application.

The embodiment of this application discloses a virtual object marking method. The "marking" here means, in an application, setting marking information for a virtual object in a virtual scene displayed by a terminal and sharing a position of the virtual object with at least one other terminal running the application, so that a player corresponding to the at least one other terminal can see the virtual object and determine the position of the virtual object. When the application is a game application, "marking" means, in a game, setting marking information for a virtual object in a virtual scene displayed by a terminal and sharing a position of the virtual object with at least one other terminal running the game application, so that a player corresponding to the at least one other terminal can see the virtual object and determine the position of the virtual object. Players corresponding to terminals sharing the virtual object form a game team.

The technical solution of the embodiment of this application and the technical effect produced by the technical solution of this application are described below through description of several example embodiments.

Figure 3:
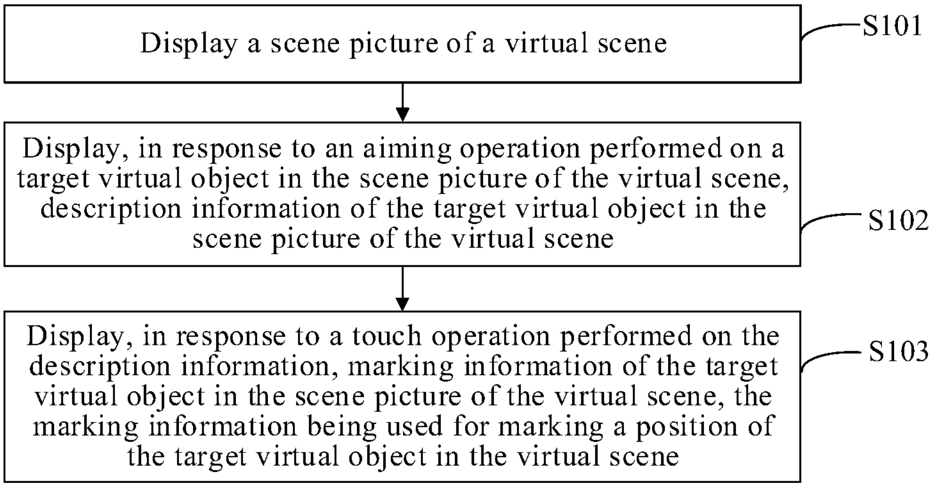
FIG. 3 is an example method flowchart of a virtual object marking method according to an embodiment of this application.

Referring to FIG. 3, the embodiment of this application provides an example virtual object marking method. In the embodiment, a description is provided by taking the method being performed by a first terminal and an application run on the first terminal being a game application as an example. The first terminal runs a client of the game application and displays a scene picture of a virtual scene of the game application. The first terminal may be implemented, for example, as the first terminal 20 as shown in FIG. 2. The method may be implemented by the following steps.

Step S101: Display a scene picture of a virtual scene.

In this example, the scene picture of the virtual scene is a scene picture displayed by a first terminal. The virtual scene is a virtual environment of a game client run on the first terminal, and the scene picture of the virtual scene is, for example, a game scene picture from a perspective of a player using the first terminal.

For example, the first terminal may be an electronic device that marks a virtual object in response to an operation. On this basis, in some embodiments, a target virtual object may be included in the scene picture of the virtual scene, and the target virtual object is a to-be-marked virtual object in the virtual scene.

Step S102: Display, in response to an aiming operation performed on a target virtual object in the scene picture of the virtual scene, description information of the target virtual object in the scene picture of the virtual scene.

In the embodiment of this application, the virtual scene may further include a virtual sight, and during playing a game, the first terminal may control the virtual object to use the virtual sight to perform an aiming action on another virtual object in the virtual scene. For ease of distinction, the virtual object controlled by the first terminal is referred to as a first virtual object. Further, in this solution, the aiming operation performed on the target virtual object in the scene picture of the virtual scene is an operation action of aiming at the target virtual object using the virtual sight by the first virtual object. In some embodiments, using the virtual sight to perform an aiming action means controlling an aim point of the virtual sight to aim at a to-be-aimed virtual object.

Figure 5A:
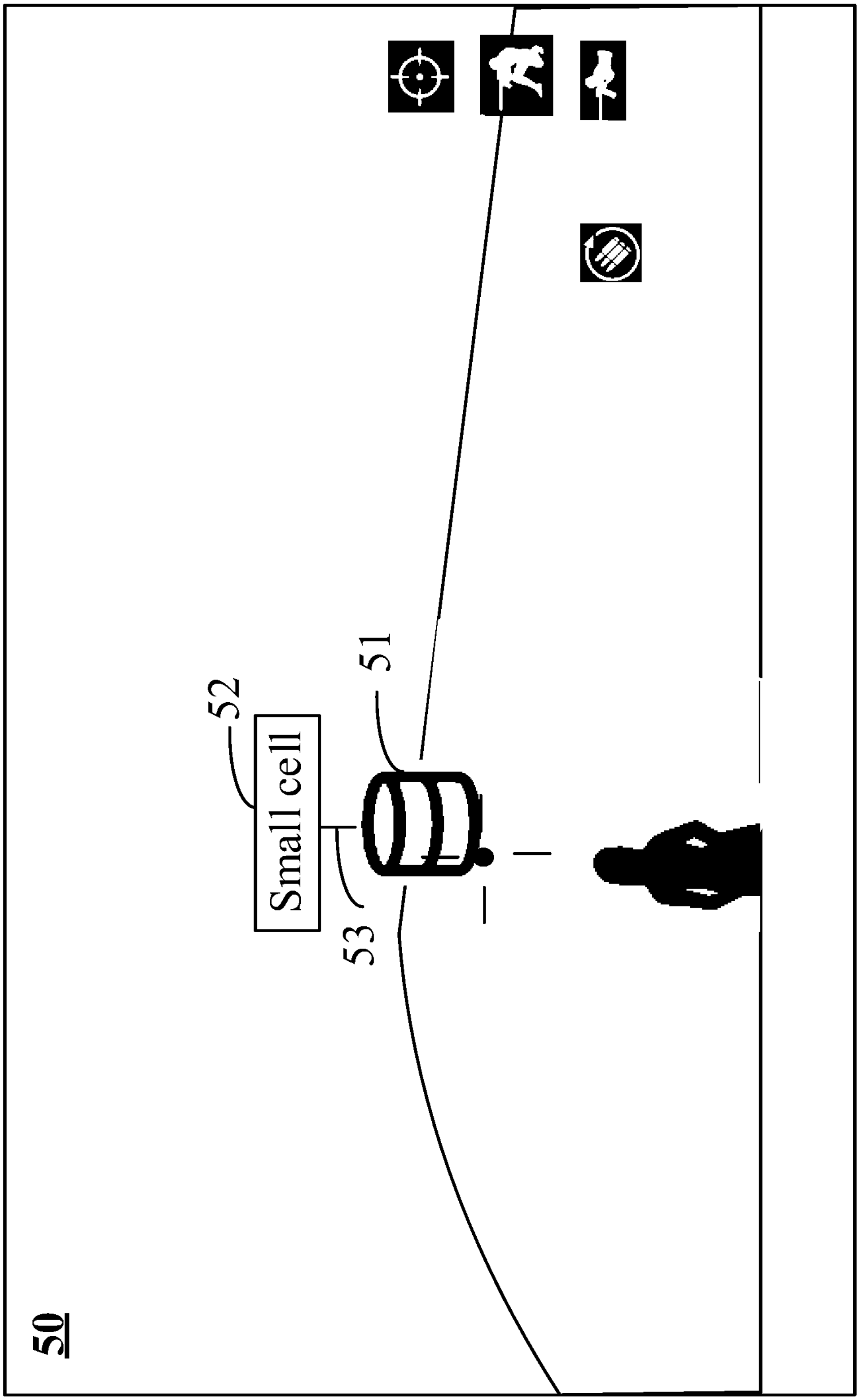
FIG. 5A is a schematic diagram of an example interface of a scene picture displaying description information according to an embodiment of this application.
Figure 5B:
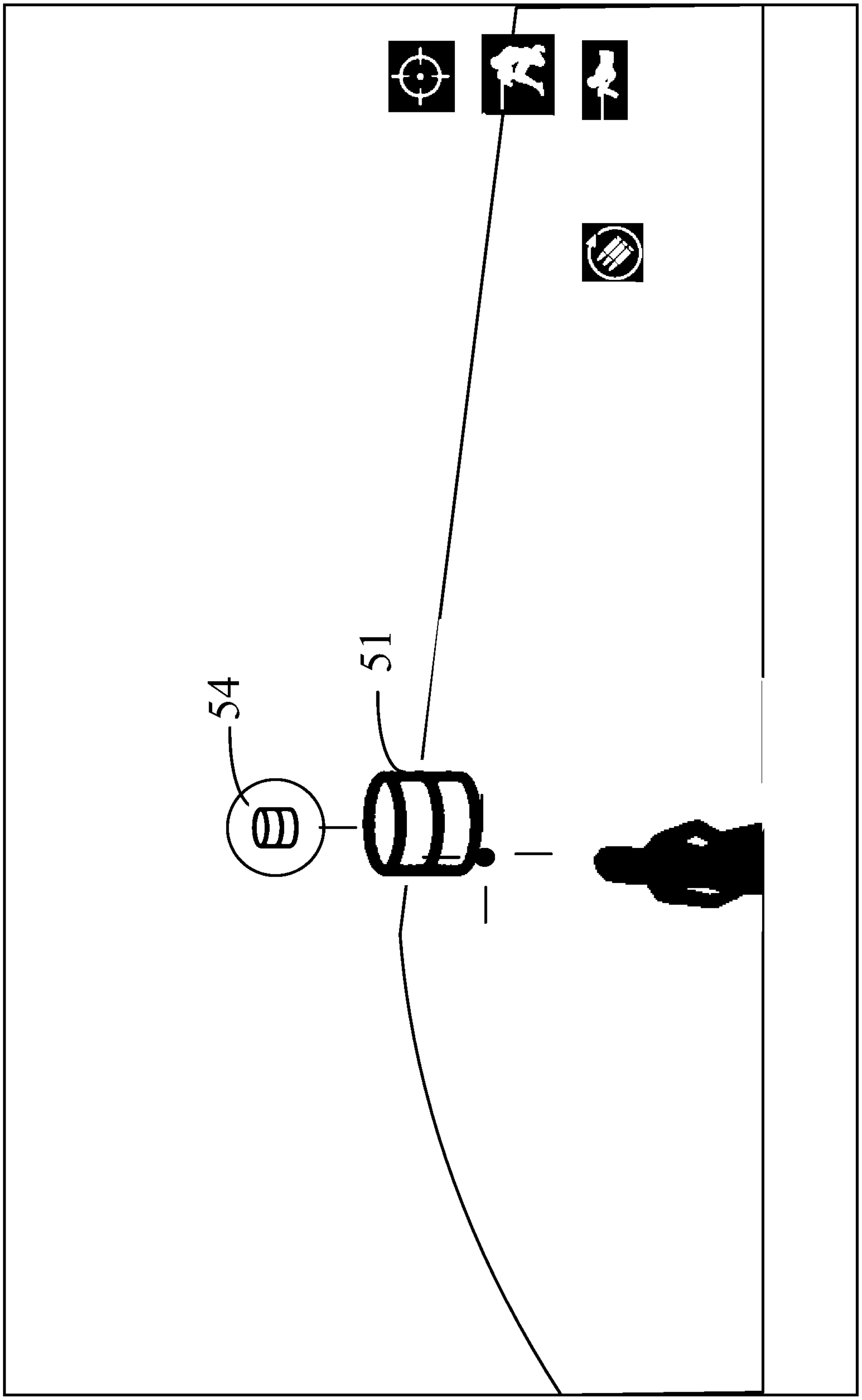
FIG. 5B is a schematic diagram of another example interface of a scene picture displaying description information according to an embodiment of this application.

For example, the virtual sight may be a virtual device for aiming at a virtual object, such as a virtual firearm in a shooting game. The aim point of the virtual sight in the scene picture of the virtual scene may be represented, for example, as a red dot, and may also be represented as the intersection of cross hair (as shown in FIG. 5A or FIG. 5B).

According to the description of the foregoing embodiments, upon the reception of an operation inputted by a player, the first terminal transmits a corresponding operation request to a server, so that the server performs a corresponding operation event on the game, and renders a scene picture of a virtual scene on which the corresponding operation event has been performed. In this example, the first terminal may report an aim point position of the virtual sight to the server, so that the server can detect whether the aim point of the virtual sight satisfies an aiming condition of aiming the target virtual object. When the aim point of the virtual sight satisfies the aiming condition of aiming the target virtual object, the server renders a scene picture displaying the description information, so that the first terminal displays the description information of the target virtual object in the scene picture of the virtual scene. In some embodiments, the foregoing aiming condition may include: a distance between the aim point position of the virtual sight and a display position of the target virtual object is less than or equal to a set distance.

In some implementations, the distance between the aim point position of the virtual sight and the display position of the target virtual object may be: a distance between the orthographic projection of the aim point of the virtual sight on a target plane and the orthographic projection of a center point of the target virtual object on the target plane. In some embodiments, the target plane may be ground in the virtual scene. In some other implementations, the distance between the aim point position of the virtual sight and the display position of the target virtual object may be: a distance between the aim point of the virtual sight and the center point of the target virtual object in any direction in three-dimensional space.

Figure 4:
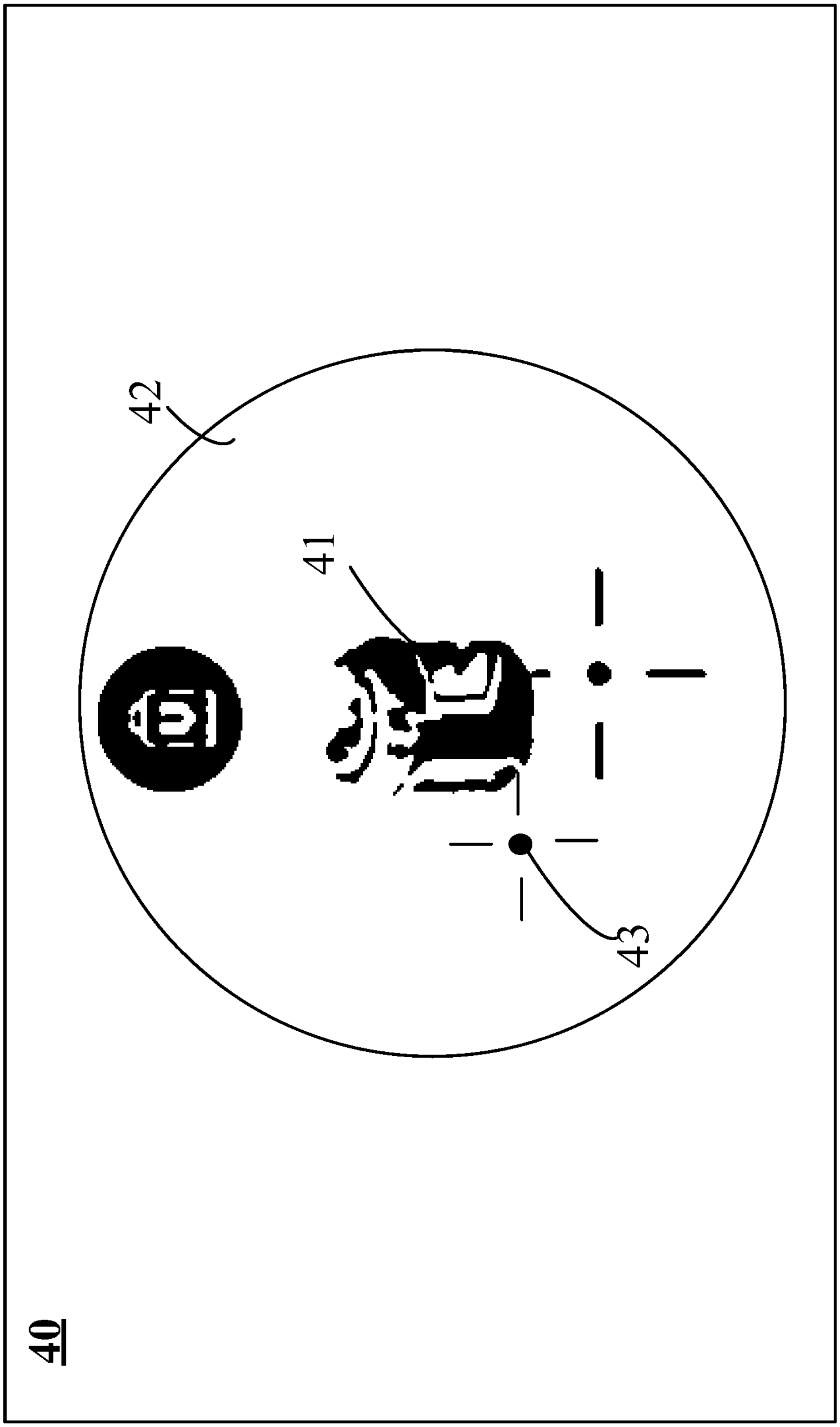
FIG. 4 is a schematic diagram of an exemplary scenario of a three-dimensional model of a virtual scene according to an embodiment of this application.

Taking the virtual scene being a three-dimensional environment scene as an example, the target virtual object in the virtual scene may be a three-dimensional model. Further, in an example virtual scene 40 shown in FIG. 4, a spherical coverage area 42 formed with a center point of a target virtual object 41 as the center of sphere and the foregoing set distance as a radius may be an aiming area of the target virtual object 41, and the remaining area of the virtual scene 40 may be, for example, a non-aiming area of the target virtual object 41. When an aim point 43 of the virtual sight is located within a range of the area 42, it is determined that the aim point position of the virtual sight and the display position of the target virtual object 41 satisfy the aiming condition, that is, the target virtual object 41 is selected, so that the server renders the scene picture illustrated in FIG. 5A or FIG. 5B. When the aim point 43 of the virtual sight is located outside the range of the area 42, it is determined that the aim point position of the virtual sight and the display position of the target virtual object 41 do not satisfy the aiming condition, that is, the target virtual object 41 is not selected.

In the implementation, the use of the spherical area centered on the target virtual object as the aiming area may enlarge the aiming area for the target virtual object. In this way, in a scenario where a screen of the first terminal is relatively small (for example, the first terminal is a mobile phone), the player may aim at the target virtual object more conveniently and accurately, thereby not only avoiding the waste of hardware resources and network resources caused by repeated aiming due to mistakes in aiming, but also optimizing game experience of the player.

In the embodiment of this application, the description information of the target virtual object includes at least one of: text description information of the target virtual object and icon description information of the target virtual object. The description information of the target virtual object is used for prompting a player what the target virtual object is. On this basis, in some embodiments, the text description information of the target virtual object may include a name of the target virtual object. The icon description information of the target virtual object includes an icon representing a shape of the target virtual object.

For example, the text description information of the target virtual object may be presented for example in a form of a text box such as the scene picture illustrated in FIG. 5A. The icon description information of the target virtual object may for example be presented in a form of a float as shown for example in the scene picture illustrated in FIG. 5B. "Float" may be short for floating icon, and a float layer may be above a scene picture layer.

For example, FIG. 5A illustrates an example scene interface of a scene picture displaying description information. As shown in FIG. 5A, the aim point of a virtual sight in a scene picture 50 aims at a target virtual object 51, which is for example a small cell. A text box 52 is included above the target virtual object 51, and text content in the text box 52 is "small cell". The text box 52 and the text content "small cell" constitute text description information of the target virtual object 51. Further, to clarify a relationship between the text box 52 and the target virtual object 51, the text box 52 and the target virtual object 51 are connected by a line 53 in FIG. 5A.

For another example, FIG. 5B illustrates another example scene interface of a scene picture displaying description information. In this example, displayed above a target virtual object 51 is a float 54 which includes an icon in a shape of a small cell. The float 54 constitutes icon description information of the target virtual object 51.

It can be understood that FIG. 5A and FIG. 5B only provide schematic descriptions and do not limit a virtual scene in embodiments of this application. In an actual implementation, the description information of the target virtual object may also be presented in other forms. In addition, a positional relationship between the description information and the target virtual object may also be in other forms. For example, the description information may be displayed at the upper right of the position of the target virtual object. This is not limited in embodiments of this application.

It can be seen that, in the implementation, when a first virtual object controlled by a first terminal uses the virtual sight to aim at the target virtual object, the first terminal displays the description information of the target virtual object to a player in the scene picture of the virtual scene, so that the player can accurately know what the target virtual object being aimed at is, thereby avoiding the waste of hardware resources and network resources caused by marking of undesired virtual objects.

Step S103: Display, in response to a selection operation performed on the description information, marking information of the target virtual object in the scene picture of the virtual scene, the marking information being used for marking a position of the target virtual object in the virtual scene.

In the embodiment of this application, the description information of the target virtual object may be a control allowing the player to trigger a marking function. On this basis, after displaying the description information of the target virtual object in the scene picture of the virtual scene, the first terminal may receive a touch operation inputted by the player through the description information, and then display, in response to the touch operation, the marking information of the target virtual object in the scene picture of the virtual scene, where the marking information is used for marking the position of the target virtual object in the virtual scene. In some embodiments, the touch operation includes a tap operation, a double-tap operation, or a long-press operation.

For example, when the first terminal displays the scene picture illustrated in FIG. 5A, the first terminal may receive an operation of the player tapping the text box 52. Then, the first terminal may update the scene picture illustrated in FIG. 5A in response to the tap operation to obtain a scene picture including the marking information. For another example, when the first terminal displays the scene picture illustrated in FIG. 5B, the first terminal may receive an operation of the player tapping the float 54. Then, the first terminal may, for example, update the scene picture illustrated in FIG. 5B to the scene picture illustrated in FIG. 6A in response to the tap operation.

In some implementations, as shown in any of FIG. 5A and FIG. 5B, in the scene picture of the virtual scene, a distance between the description information of the target virtual object and the target virtual object is less than or equal to a first distance. In this way, a control for the first terminal to receive the touch operation is relatively close to the target virtual object, so that the player can input the touch operation without looking away, thereby optimizing the game experience of the player.

According to the foregoing description of "marking", the objective of adding the marking information to the target virtual object is to share a location of the target virtual object between clients run on multiple terminals. On this basis, after the first terminal receives the player's selection operation performed on the description information, the first terminal and at least one other terminal, such as a second terminal, display the marking information in the scene picture of the virtual scene displayed. The example scene picture displayed by the first terminal is shown in any interface schematic diagram in FIG. 6A to FIG. 7, and the example scene picture displayed by the second terminal is shown in FIG. 8.

In an actual implementation, the scene picture containing the marking information corresponding to each foregoing terminal is rendered by a server. For example, after receiving the player's selection operation performed on the description information, the first terminal may send a marking request to the server. The marking request may include an identifier of the target virtual object and a team identity corresponding to the game client run on the first terminal. Then, the server may obtain at least one other client corresponding to the team identity, the scene pictures of each client, and the terminal corresponding to each client. After that, the server adds marking information for the virtual scene corresponding to each client according to the identifier of the target virtual object, and then renders the scene picture, to which the marking information has been added, corresponding to each client, and sends each scene picture to each corresponding terminal.

The implementation of the marking information and displaying of the marking information is described below by taking the first terminal as an example.

In some embodiments, the marking information may include at least one of: identifier information, attribute prompt information, and distance prompt information of the target virtual object. The identifier information of the target virtual object is used for prompting the player what the target virtual object is, and the identifier information may be, for example, a name of the target virtual object and/or an icon representing the shape of the target virtual object. The attribute prompt information is used for indicating attribute information of the target virtual object, and may include, for example, at least one of: a function and usage of the target virtual object and so on. The distance prompt information is used for indicating a distance between the target virtual object and the first virtual object in the virtual scene.

It can be understood that the specific information of the marking information listed above is a schematic description and does not constitute a limitation on the marking information in the present technical solution. In some other implementations, the marking information in embodiments of this application may also include more or less information, which is not described in details in embodiments of this application.

In some other implementations, during displaying the marking information in the scene picture of the virtual scene, the first terminal may also display the text prompt information in the scene picture of the virtual scene, and content of the text prompt information may be "You marked xx" or "You pinged loot: xx". Here, "xx" may be the name of the target virtual object in the game, and "xx" is for example "small cell".

In some implementations, the first terminal may dynamically display the marking information in the scene picture of the virtual scene. For example, dynamically displaying the marking information in the scene picture of the virtual scene includes at least one of: dynamically displaying the icon description information of the target virtual object and dynamically displaying the distance prompt information. For example, in any scene picture of a corresponding virtual scene, the first terminal may display in real time the updated distance information between the first virtual object and the target virtual object in the corresponding scene picture as the first virtual object moves in the corresponding scene picture.

Figure 6A:
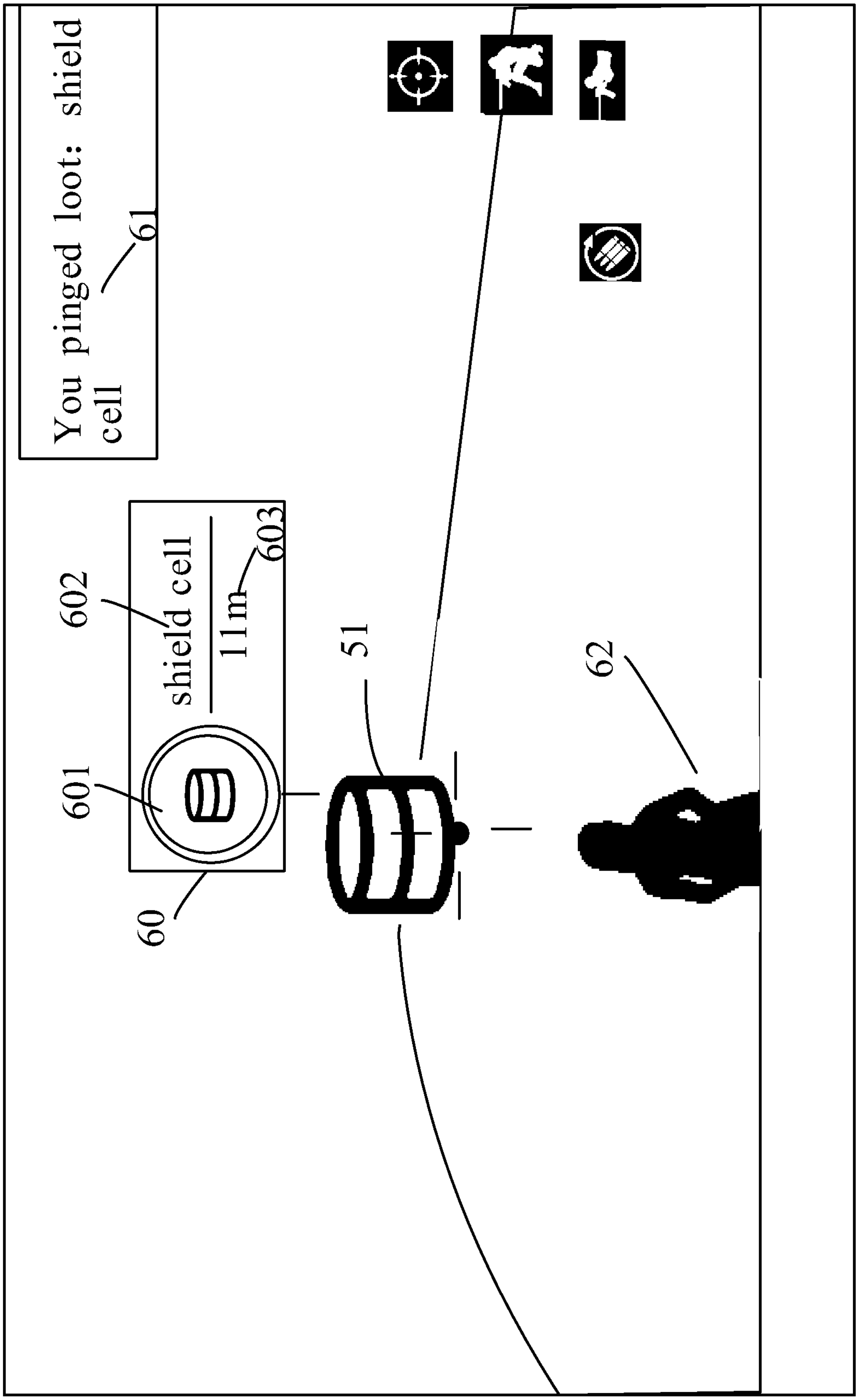
FIG. 6A is a schematic diagram of an example interface of a scene picture displaying marking information according to an embodiment of this application.

FIG. 6A is a schematic diagram of an example interface of a scene picture displaying marking information. The scene picture illustrated in FIG. 6A is obtained for example by updating the scene picture illustrated in FIG. 5B. The scene picture illustrated in FIG. 6A includes marking information 60, text prompt information 61, and a first virtual object 62. The marking information 60 is used for marking a position of a target virtual object 51 in FIG. 6A and includes identifier information 601, attribute prompt information 602, and distance prompt information 603. The identifier information 601 is displayed in the form of a float, and the float always exhibits a dynamic effect of an expanded circle. The content of the attribute prompt information 602 is, for example, a "shield cell", indicating that the attribute of the target virtual object 51 is a shield cell. The content of the distance prompt information 603 is for example "11 m (meters)", indicating that the distance between the first virtual object 62 and the target virtual object 51 in the scene illustrated in FIG. 6A is 11 meters. In addition, the text prompt information 61 is displayed, for example, in a chat box included in the scene picture illustrated in FIG. 6A, and the content of the text prompt information 61 is, for example, "You pinged loot: shield cell", indicating operation information of a player corresponding to a first terminal.

Further, on the basis of the scene picture of the virtual scene illustrated in FIG. 6A, the first terminal may control, in response to an operation of the player, the first virtual object 62 to move in the virtual scene. In this process, the scene picture of the virtual scene is continuously updated with the movement of the first virtual object 62, and the content of the distance prompt information 603 in the marking information 60 is also continuously updated with the movement of the first virtual object 62.

Figure 6B:
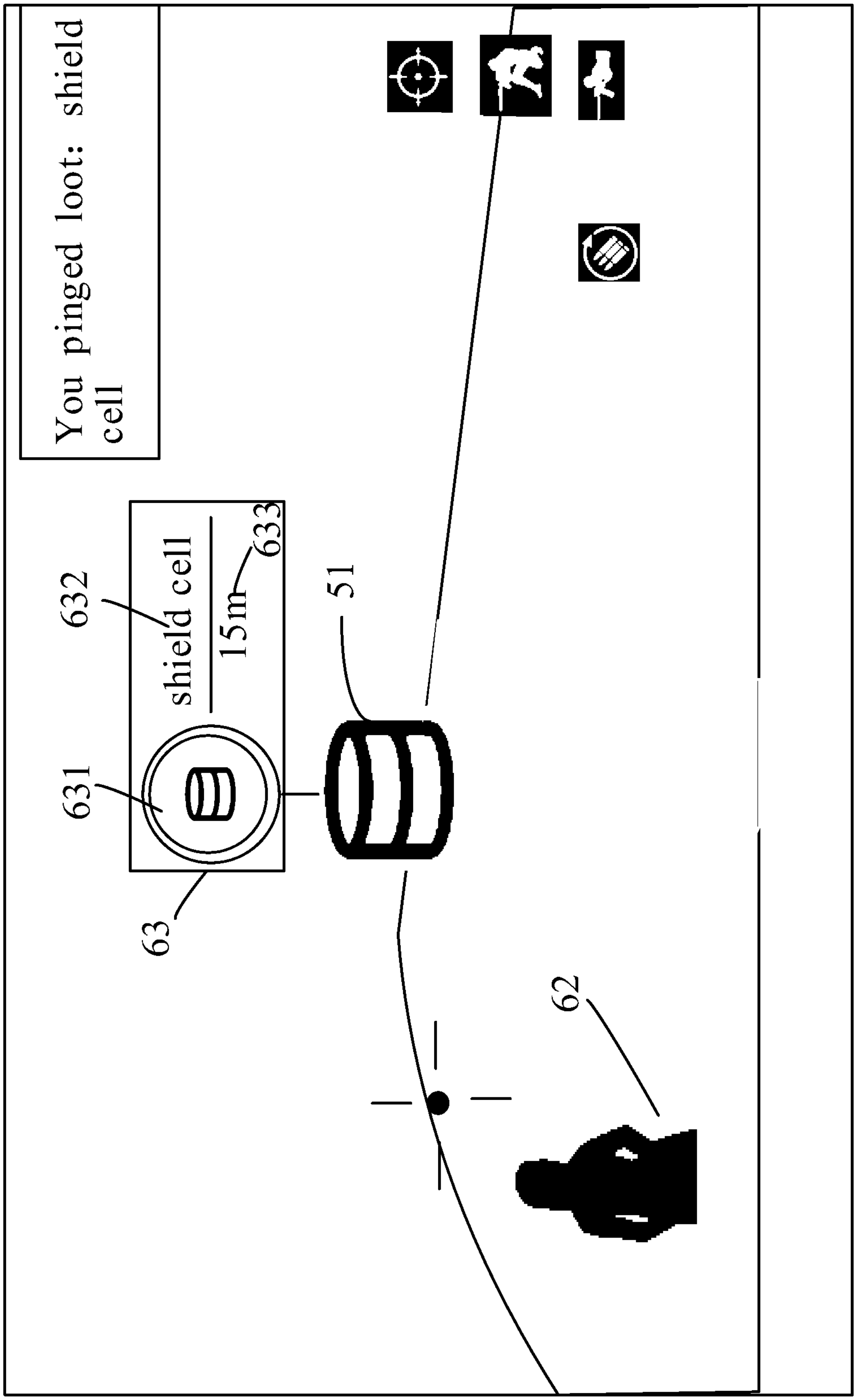
FIG. 6B is a schematic diagram of another example interface of a scene picture displaying marking information according to an embodiment of this application.

For example, on the basis of the scene picture illustrated in FIG. 6A, the first terminal controls the first virtual object 62 to move from the position in the scene picture illustrated in FIG. 6A to the position in the scene picture illustrated in FIG. 6B. Accordingly, the scene picture illustrated in FIG. 6A is continuously updated to obtain the scene picture illustrated in FIG. 6B. The scene picture illustrated in FIG. 6B includes the marking information 63 used for marking the position of the target virtual object 51 in FIG. 6B. The marking information 63 includes identifier information 631, attribute prompt information 632 and distance prompt information 633. The implementation of the identifier information 631 is the same as the implementation of the identifier information 601 in FIG. 6A, and the implementation of the attribute prompt information 632 is the same as implementation of the attribute prompt information 602 in FIG. 6A, which are not described in detail here. The content of the distance prompt information 633 is, for example, "15 m", indicating that the distance between the first virtual object 62 and the target virtual object 51 in the scene illustrated in FIG. 6B is 15 meters.

It can be understood that FIG. 6A and FIG. 6B only provide schematic descriptions and do not limit the manner of displaying the marking information in the embodiments of the present application. In some other implementations, the marking information may also be displayed in other dynamic forms. This is not limited in embodiments of this application.

In some other implementations, to further optimize game experience of the player, the first terminal may always display the marking information at a specified position relative to the target virtual object in any subsequent scene picture of the virtual scene. That is, regardless of the positional relationship between the first virtual object and the target virtual object, from the perspective of the first virtual object, the relative position of the marking information and the target virtual object remains unchanged.

For example, referring to FIG. 6A, from the player's perspective, in the scene picture illustrated in FIG. 6A, the target virtual object 51 is located above the first virtual object 62, and the identifier information 601 is displayed at the upper left corner of the target virtual object 51. From the perspective of the first virtual object 62, the identifier information 601 is displayed, for example, at the upper right corner of the target virtual object 51. When the scene picture of FIG. 6A has been updated to the scene picture of FIG. 7, referring to FIG. 7, from the player's perspective, in the scene picture illustrated in FIG. 7, the first virtual object 62 is located at the left of the target virtual object 51, and the identifier information in FIG. 7 may be displayed at the lower side of the target virtual object 51. In this way, it can be ensured that the identifier information is still displayed at the upper right corner of the target virtual object 51 in the scene picture of FIG. 7 from the perspective of the first virtual object 62.

It can be seen that, in the implementation, the first terminal displays description information of the target virtual object in the scene picture of the virtual scene in response to an aiming operation of the target virtual object in the scene picture of the displayed virtual scene. Further, in response to a selection operation performed on the description information, the first terminal displays the marking information of the target virtual object in the scene picture of the virtual scene. In other words, when a virtual sight aims at the target virtual object, the first terminal displays the description information of the target virtual object to the player in the scene picture of the virtual scene, so that the player learns information of the aimed target virtual object. Further, the use of the description information of the target virtual object as a function entry for the player to trigger marking enables the player to mark the target virtual object when clearly knowing the target virtual object. In this way, mistakes in marking game items due to mistaking the game items by the player can be avoided, so that marked game items are the game items that the player wants to mark, thereby avoiding the waste of hardware resources and network resources caused by repeated modifications of marks due to the mistakes in marking. In addition, marking the target virtual object in response to an operation performed on the description information can improve convenience of marking the target virtual object, and also improve operation efficiency of a device displaying the target virtual object. Moreover, the marking information of the target virtual object may indicate the position of the target virtual object in the virtual scene, thereby further improving user experience.

FIG. 5A to FIG. 7 are all scene interfaces of virtual scenes displayed by the first terminal. In an actual implementation, after the first terminal responds to the touch operation of the player performed on the description information, the marking information is also displayed in a scene interface of a corresponding game on another terminal, and the marking information displayed by any terminal is used for marking the position of the target virtual object in the scene picture of the terminal, thereby realizing sharing of the position of the target virtual object.

The implementation of the scene picture of another client of the corresponding game is described below by taking a second terminal as an example.

Figure 7:
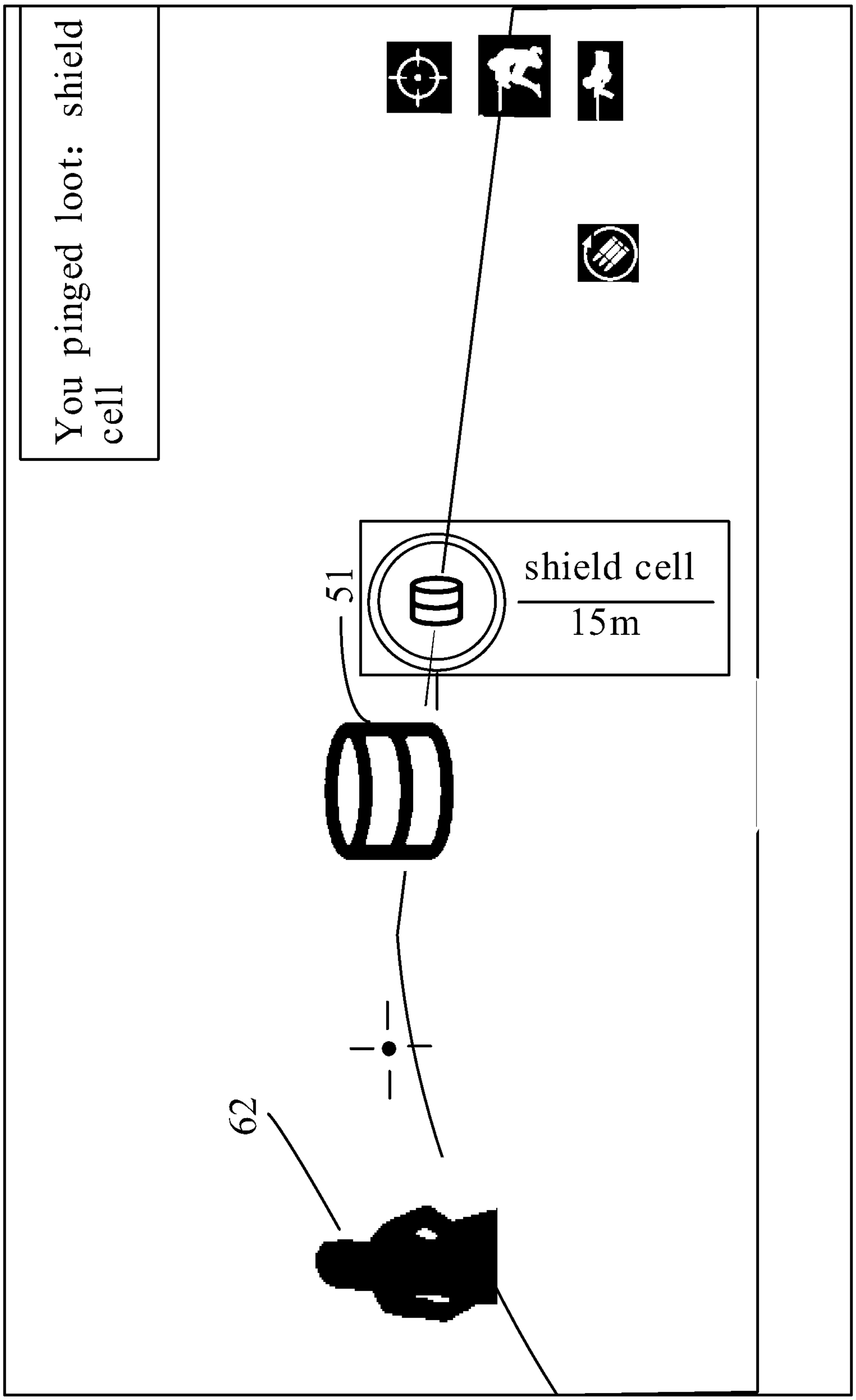
FIG. 7 is a schematic diagram of a third example interface of a scene picture displaying marking information according to an embodiment of this application.
Figure 8:
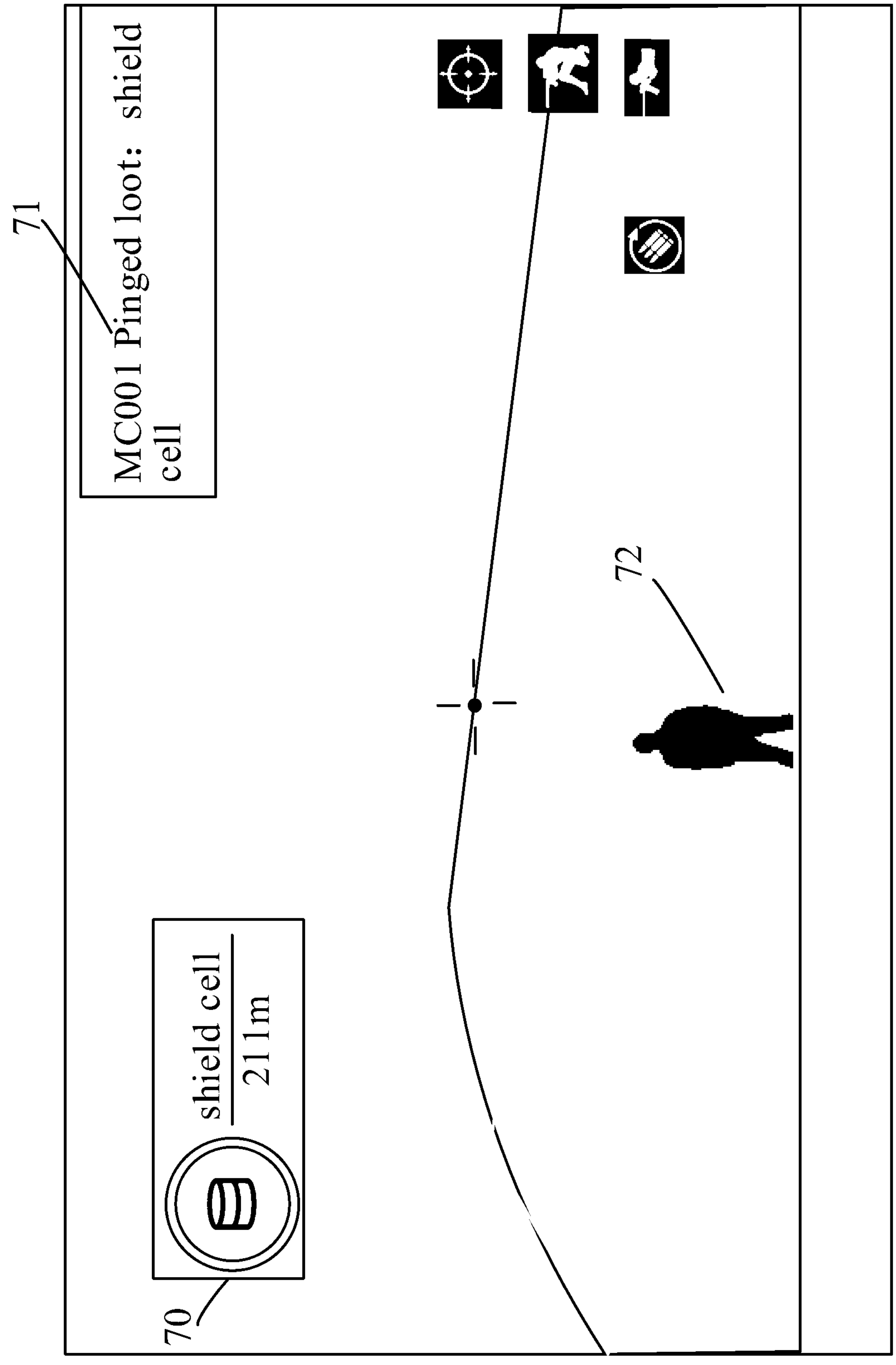
FIG. 8 is a schematic diagram of a fourth example interface of a scene picture displaying marking information according to an embodiment of this application.

In some implementations, when the scene picture of the virtual scene displayed by the second terminal includes the target virtual object, the scene picture including the marking information displayed by the second terminal is similar to the scene picture displayed in any of FIG. 6A to FIG. 7, and is not repeatedly described here. In some other implementations, when the scene picture of the virtual scene displayed by the second terminal does not include the target virtual object, the second terminal displays the marking information at a target position in the corresponding scene picture, and the target position indicates a corresponding position of the target virtual object in the scene picture.

For example, FIG. 8 is a schematic diagram of an example interface of a scene picture displayed by a second terminal. The scene picture illustrated in FIG. 8 corresponds for example to the foregoing implementation scenes illustrated in FIG. 6A to FIG. 7. The scene picture illustrated in FIG. 8 includes marking information 70, text prompt information 71 and a second virtual object 72, but does not include a target virtual object. In this example, the marking information 70 is located at the upper left position of the scene picture illustrated in FIG. 8, indicating that the target virtual object in the scene picture illustrated in FIG. 8 is located at the upper left position of a current scene. The marking information 70 includes, for example, identifier information, attribute prompt information, and distance prompt information. Display forms of the identifier information and the attribute prompt information are the same as those shown in any of FIG. 6A to FIG. 7 and are not repeatedly described here. The distance prompt information is used for indicating a distance between the second virtual object 72 and the target virtual object in the scene illustrated in FIG. 8. In addition, in FIG. 8, the text prompt information 71 is displayed, for example, in a chat box included in the scene picture illustrated in FIG. 8, and the content of the text prompt information 71 is, for example, "MC001 pinged loot: shield cell". The MC001 is, for example, an account name of a player of a first terminal, so as to give a prompt on a second terminal about operation information of a corresponding player teammate MC001.

The second terminal may also dynamically display the marking information in the scene picture of a virtual scene. The implementation of the second terminal dynamically displaying the marking information is similar to that of the first terminal dynamically displaying the marking information, and is not repeatedly described in the embodiment of the present application.

It can be understood that the foregoing FIG. 5A to FIG. 8 are all examples for describing the technical solution, and do not limit the virtual scene in the embodiments of the present application. In an actual implementation, the virtual scenes displayed by the first terminal and the second terminal are flexibly displayed in different games, and the scene pictures of the virtual scenes displayed by the first terminal and the second terminal may be different from the scene pictures displayed in FIG. 5A to FIG. 8. In addition, dynamic display effects of the first terminal and the second terminal may be also different from the display effect illustrated in FIG. 5A to FIG. 8. This is not limited in embodiments of this application.

In addition, the virtual object marking method of the embodiment of this application is described by taking a shooting game as an example in the foregoing embodiment of this application. However, the application of the virtual object marking method of the embodiment of this application is not limited to shooting games. The technical solution is also applicable to other team battle games and games equipped with game items with various functions to achieve same effects. Examples are not given in details in embodiments of this application.

To sum up, in the scene picture of the virtual scene displayed by the first terminal, the first terminal displays description information of the target virtual object in the scene picture of the virtual scene in response to an aiming operation performed on the target virtual object in the scene picture of the virtual scene. Further, the first terminal displays marking information of the target virtual object in the scene picture of the virtual scene in response to a selection operation performed on the description information, where the marking information is used for marking the position of the target virtual object in the virtual scene. The aiming operation is an aiming action performed on the target virtual object by using a virtual sight by the first virtual object controlled by the first terminal. In other words, when a virtual sight aims at the target virtual object, the first terminal displays the description information of the target virtual object to the player in the scene picture of the virtual scene, so that the player learns information of the aimed target virtual object. Further, the use of the description information of the target virtual object as a function entry for the player to trigger marking enables the player to mark the target virtual object when clearly knowing the target virtual object. It can be seen that the technical solution of the embodiment of this application can avoid mistakes in marking game items by a player, so that a marked game item is the game item that the player wants to mark, thereby avoiding the waste of hardware resources and network resources caused by repeated modification of marks due to mistakes in marking. In addition, marking the target virtual object in response to an operation performed on the description information can improve convenience of marking the target virtual object, and also improve operation efficiency of a device displaying the target virtual object. Moreover, the marking information of the target virtual object may indicate the position of the target virtual object in the virtual scene, thereby further improving user experience.

In the foregoing embodiment, implementations of the virtual object marking method provided by embodiments of this application are introduced by describing actions performed by terminals, such as the display of description information and the display of marking information. It is to be understood that, functions corresponding to processing steps of displaying description information and displaying marking information may be implemented in the form of hardware or a combination of hardware and computer software in the embodiments of the present application. Whether a function is implemented by hardware or computer software driving hardware depends on particular applications and design constraints of the technical solution. A person skilled in the art may use different methods to implement the described functions for each particular application, but the implementation is not considered beyond the scope of this application.

Figure 9A:
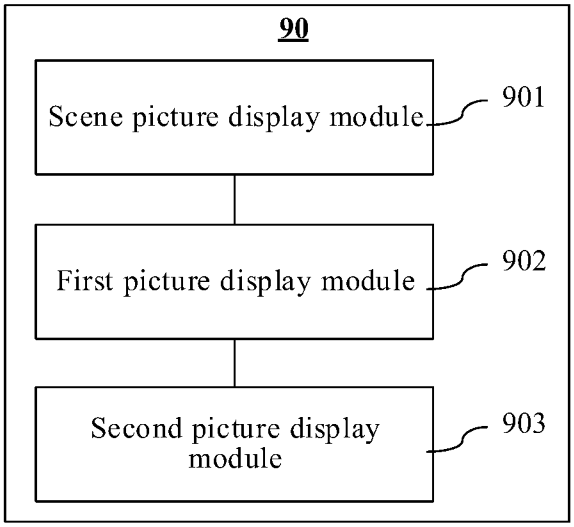
FIG. 9A is a schematic diagram of an example structure of a virtual object marking apparatus 90 according to an embodiment of this application.

For example, when corresponding functions are implemented through software modules in the foregoing steps, as illustrated in FIG. 9A, a virtual object marking apparatus 90 is provided. The virtual object marking apparatus 90 may include a scene picture display module 901, a first picture display module 902, and a second picture display module 903. The virtual object marking apparatus 90 may be used for performing some or all of the operations of the first terminal in FIG. 3 to FIG. 8 described above.

For example, a scene picture display module 901 may be configured to display a scene picture of a virtual scene. A first picture display module 902 may be configured to display, in response to an aiming operation performed on a target virtual object in the scene picture of the virtual scene, description information of the target virtual object in the scene picture of the virtual scene, the aiming operation being an aiming action performed on the target virtual object by a first virtual object using a virtual sight, and the first virtual object being a virtual object controlled by a first terminal. A second picture display module 903 may be configured to display, in response to a selection operation performed on the description information, marking information of the target virtual object in the scene picture of the virtual scene, the marking information being used for marking a position of the target virtual object in the virtual scene.

In view of the above, in the displayed scene picture of the virtual scene, the virtual object marking apparatus 90 according to the embodiment of this application displays description information of the target virtual object in the scene picture of the virtual scene in response to an aiming operation performed on the target virtual object in the scene picture of the virtual scene. Further, marking information of the target virtual object is displayed in the scene picture of the virtual scene in response to a selection operation performed on the description information, where the marking information is used for marking a position of the target virtual object in the virtual scene. The aiming operation is an aiming action performed on the target virtual object by using a virtual sight by the first virtual object controlled by the virtual object marking apparatus 90. In other words, when a virtual sight aims at the target virtual object, the virtual object marking apparatus 90 displays the description information of the target virtual object to the player in the scene picture of the virtual scene, so that the player learns information of the aimed target virtual object. Further, the use of the description information of the target virtual object as a function entry for the player to trigger marking enables the player to mark the target virtual object when clearly knowing the target virtual object. It can be seen that the technical solution of the embodiment of this application can avoid mistakes in marking game items by a player, so that a marked game item is the game item that the player wants to mark, thereby avoiding the waste of hardware resources and network resources caused by repeated modification of marks due to mistakes in marking. In addition, marking the target virtual object in response to an operation performed on the description information can improve convenience of marking the target virtual object, and also improve operation efficiency of a device displaying the target virtual object. Moreover, the marking information of the target virtual object may indicate the position of the target virtual object in the virtual scene, thereby further improving user experience.

In some embodiments, the description information includes at least one of:

text description information of the target virtual object; and icon description information of the target virtual object, where the icon description information includes an icon representing a shape of the target virtual object.

In some embodiments, the first picture display module 902 is further configured to display the description information within a first distance from the target virtual object in the scene picture of the virtual scene.

In some embodiments, the marking information include at least one of:

marking information of the target virtual object;

attribute prompt information, used for indicating attribute information of the target virtual object; and distance prompt information, used for indicating a distance between the target virtual object and the first virtual object in the virtual scene.

In some embodiments, the second picture display module 903 is further configured to dynamically display the marking information in the scene picture of the virtual scene. In some embodiments, the second picture display module 903 is further configured to display the marking information at a specified position relative to the target virtual object in any subsequent scene picture of the virtual scene.

In some embodiments, the second picture display module 903 is further configured to dynamically display the icon description information of the target virtual object. In this example, the second picture display module 903 is further configured to, in any scene picture of a corresponding virtual scene, display in real time updated distance information between the first virtual object and the target virtual object in the corresponding scene picture as the first virtual object moves in the corresponding scene picture.

In some embodiments, the first picture display module 902 is further configured to display, in response to an aiming action performed on the target virtual object by the first virtual object using a virtual sight satisfying an aiming condition, description information of the target virtual object in the scene picture of the virtual scene. The aiming condition includes: a distance between the aim point position of the virtual sight and a display position of the target virtual object is less than or equal to a set distance.

In some embodiments, a touch operation includes a tap operation, a double-tap operation, or a long-press operation.

It can be understood that the division of the foregoing modules is merely division of logical functions. In actual implementations, the functions of the foregoing modules may be integrated in a hardware entity for implementation. For example, functions of the scene picture display module 901 may be integrated into a display for implementation; and some functions of the first picture display module 902 and the second picture display module 903 may be integrated into a processor for implementation, and the remaining functions may be integrated into a display for implementation, etc.

Figure 9B:
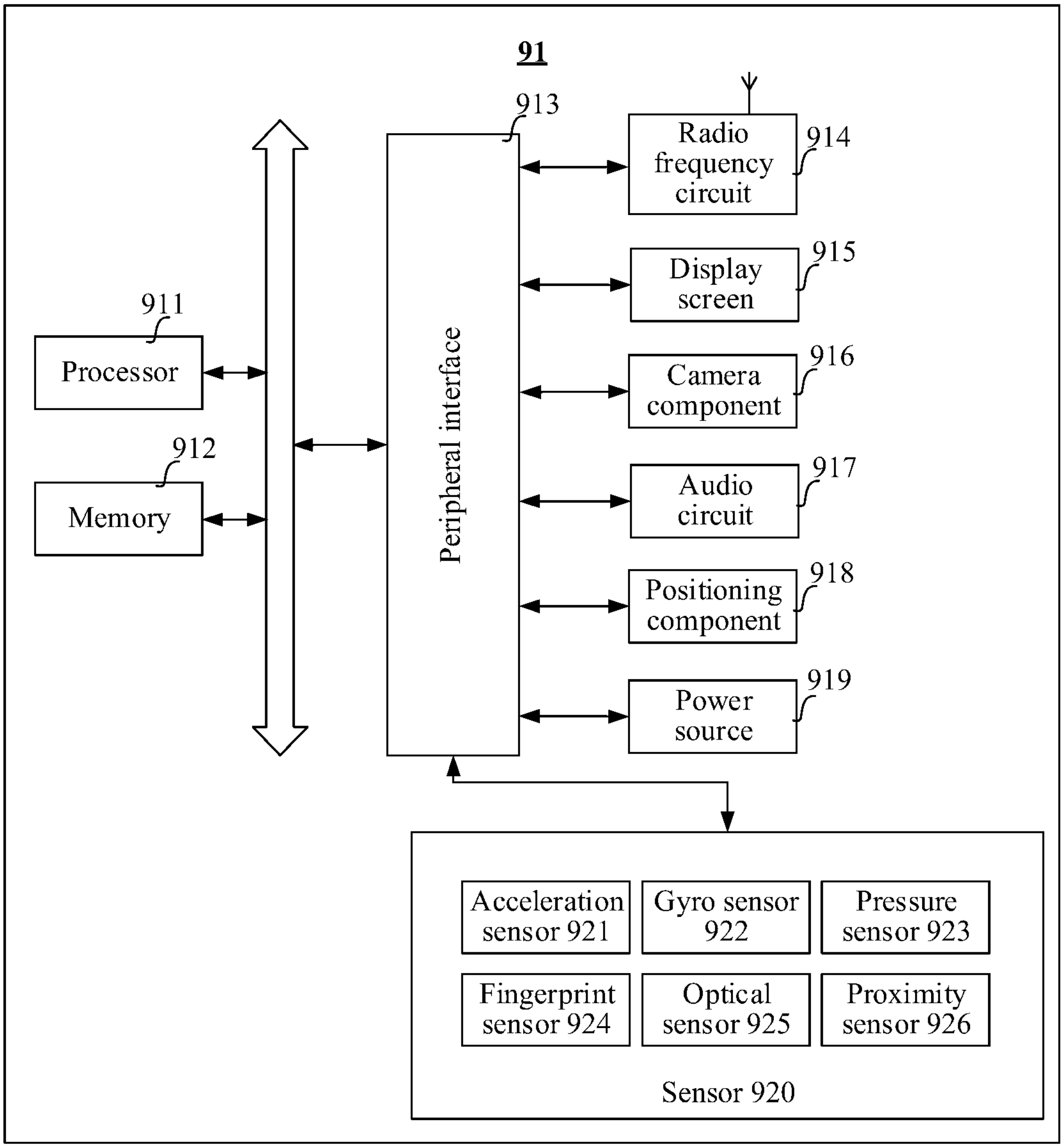
FIG. 9B is a schematic diagram of an example structure of an electronic device 91 according to an embodiment of this application.

FIG. 9B shows an example electronic device 91. The electronic device 91 may be used as the first terminal, such as a smartphone, a tablet computer, a moving picture experts group audio layer III (MP3) player, a moving picture experts group audio layer IV (MP4) player, a notebook computer, or a desktop computer. The electronic device 91 may also be referred to as another name such as user equipment, a portable terminal, a laptop terminal, or a desktop terminal.

In general, the electronic device 91 includes: a processor 911 and a memory 912.

The processor 911 may include one or more processing cores, for example, a quad-core processor or an octa-core processor. The processor 911 may be implemented in at least one hardware form of digital signal processing (DSP), field-programmable gate array (FPGA), and programmable logic array (PLA). The processor 911 may also include a primary processor and a coprocessor. The primary processor is a processor configured to process data in an awake state, and is also referred to as a central processing unit (CPU); and the coprocessor is a low-power processor configured to process data in a standby state. In some implementations, the processor 911 may be integrated with a graphics processing unit (GPU). The GPU is configured to render and draw content to be displayed on a display screen. In some implementations, the processor 911 may further include an artificial intelligence (AI) processor. The AI processor is configured to process computing operations related to machine learning.

The memory 912 may include one or more computer-readable storage media that may be non-transitory. The memory 912 may further include a high-speed random access memory and a non-volatile memory, for example, one or more disk storage devices or flash storage devices. In some implementations, a non-transient computer-readable storage medium in the memory 912 is configured to store at least one instruction. The at least one instruction is executed by the processor 911 to perform all or some of steps of the virtual object marking method provided in embodiments of this application.

In some implementations, the electronic device 91 may further include: a peripheral interface 913 and at least one peripheral. The processor 911, the memory 912, and the peripheral interface 913 may be connected through a bus or a signal cable. Each peripheral may be connected to the peripheral interface 913 through a bus, a signal cable, or a circuit board. Specifically, the peripheral includes: at least one of a radio frequency circuit 914, a display screen 915, a camera assembly 916, an audio circuit 917, a positioning assembly 918, and a power source 919.

The peripheral interface 913 may be configured to connect the at least one peripheral related to Input/Output (I/O) to the processor 911 and the memory 912. In some implementations, the processor 911, the memory 912, and the peripheral interface 913 may be integrated into a same chip or circuit board. In some other embodiments, any or both of the processor 911, the memory 912, and the peripheral interface 913 may be implemented on an independent chip or circuit board. This is not limited in embodiments of this application.

The radio frequency circuit 914 is configured to receive and transmit a radio frequency (RF) signal that is also referred to as an electromagnetic signal. The display screen 915 is configured to display a user interface (UI). The UI may include a graphic, text, an icon, a video, and any combination thereof. The UI includes the scene picture of the virtual scene, as shown in any of FIG. 5A to FIG. 8. When the display screen 915 is a touch display screen, the display screen 915 is further capable of collecting a touch signal on or above a surface of the display screen 915. The touch signal may be inputted to the processor 911 for processing, as a control signal, for example, the input signal corresponding to the touch operation in the foregoing embodiments. In this case, the display screen 915 may be further configured to provide a virtual button and/or a virtual keyboard that are/is also referred to as a soft button and/or a soft keyboard. In some implementations, there may be one display screen 915, disposed on a front panel of the electronic device 91. In some other implementations, there may be at least two display screens 915, disposed on different surfaces of the electronic device 91 respectively or in a folded design. In some implementations, the display screen 915 may be a flexible display screen, disposed on a curved surface or a folded surface of the electronic device 91. The display screen 915 may further be set to have a non-rectangular irregular shape, that is, a special-shaped screen. The display screen 915 may be prepared by using materials such as a liquid crystal display (LCD), an organic light-emitting diode (OLED), or the like.

The camera component 916 is configured to collect images or videos. The audio circuit 917 may include a microphone and a speaker. The positioning component 918 is configured to position a current geographic location of the electronic device 91, to implement a navigation or a location-based service (LBS). The power source 919 is configured to supply power to components in the electronic device 91.

In some implementations, the electronic device 91 further include one or more sensors 920. The one or more sensors 920 include, but are not limited to: an acceleration sensor 921, a gyro sensor 922, a pressure sensor 923, a fingerprint sensor 924, an optical sensor 925, and a proximity sensor 926.

It may be understood that FIG. 9B only provides a schematic description and constitutes no limitation on the electronic device 91. In some other implementations, the electronic device 91 may include more or fewer components than those shown in FIG. 9B, or some components may be combined, or components are arranged in different manners.

An embodiment of this application further provides a computer-readable storage medium. The computer-readable storage medium stores a virtual object marking-related instruction, which, when run on a computer, causes the computer to perform some or all steps of the method described in the embodiments according to FIG. 3 to FIG. 8.

An embodiment of this application further provides a computer program product including a virtual object marking-related instruction, which, when run on a computer, causes the computer to perform some or all steps of the method described in the embodiments according to FIG. 3 to FIG. 8.

A person skilled in the art may clearly understand that, for the purpose of convenient and brief description, for a detailed working process of the system, apparatus, and unit described above, refer to a corresponding process in the method embodiments, and details are not described herein again.

In the several embodiments provided in this application, it is to be understood that the disclosed system, apparatus, and method may be implemented in other manners. For example, the described apparatus embodiments are only example. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in a form of a software product. The computer software product is stored in a storage medium and includes several instructions for causing a computer device (which may be a personal computer, a game control apparatus, a network device, or the like) to perform all or some of the steps of the method in embodiments of this application. The foregoing storage medium includes: any medium that can store program code, such as a USB flash disk, a removable hard disk, a read-only memory (ROM), a random access memory (RAM), a magnetic disk, or an optical disk.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. Although some embodiments of this application have been described, a person skilled in the art can make changes and modifications to these embodiments once learn the basic inventive concept. Therefore, the following claims are intended to be construed as to cover embodiments of this application and all changes and modifications falling within the scope of this application.

The objectives, technical solutions, and benefits of this application are further described in detail in the foregoing specific embodiments. It is to be understood that the foregoing descriptions are merely specific embodiments of this application, but are not intended to limit the protection scope of this application. Any modification, equivalent replacement, improvement or the like made based on the technical solutions in this application shall fall within the protection scope of the present disclosure.

What is claimed is:

1. A method performed by an electronic device acting as a first terminal, comprising:

displaying a scene picture of a virtual scene;

detecting an aiming operation performed on a target virtual object in the scene picture of the virtual scene by a first virtual object controlled by the first terminal using an aim point of a virtual sight;

in response to a determination that a distance between a position of the aim point and a display position of the target virtual object is less than or equal to a predetermined distance, displaying description information of the target virtual object in the scene picture of the virtual scene;

in response to a touch operation performed on the description information, displaying marking information including (i) a name of the target virtual object and (ii) position information marking a position of the target virtual object relative to the first virtual object in the scene picture of the virtual scene; and in response to the touch operation performed on the description information, transmitting the marking information to a second virtual object in the virtual scene controlled by a second terminal, the marking information including (i) the name of the target virtual object and (ii) position information marking the position of the target virtual object relative to the second virtual object in the virtual scene.

2. The method according to claim 1, further comprising:

in response to the touch operation performed on the description information, causing a display of the marking information of the target virtual object in a scene picture of the virtual scene on the second terminal.

3. The method according to claim 1, wherein the description information comprises icon of the target virtual object.

4. The method according to claim 1, further comprising:

canceling the display of the description information when the aiming operation performed on the target virtual object stops.

5. The method according to claim 1, wherein the displaying description information of the target virtual object in the scene picture comprises:

displaying the description information within a first distance from the target virtual object in the scene picture of the virtual scene.

6. The method according to claim 1, wherein the marking information comprises distance prompt information, indicating a real time distance between the target virtual object and the first virtual object in the virtual scene.

7. The method according to claim 1, wherein the displaying marking information of the target virtual object in the scene picture of the virtual scene comprises dynamically displaying the marking information at a position of the scene picture of the virtual scene according to a relative position of the target virtual object from the first virtual object.

8. The method according to claim 1, wherein the touch operation comprises a tap operation, a double-tap operation, or a long-press operation on a touch display screen of the electronic device.

9. An electronic device acting as a first terminal and comprising a processor and a memory, the memory storing at least one instruction, and the at least one instruction being loadable and executable by the processor and causing the electronic device to implement a method including:

displaying a scene picture of a virtual scene;

detecting an aiming operation performed on a target virtual object in the scene picture of the virtual scene by a first virtual object controlled by the first terminal using an aim point of a virtual sight;

in response to a determination that a distance between a position of the aim point and a display position of the target virtual object is less than or equal to a predetermined distance, displaying description information of the target virtual object in the scene picture of the virtual scene;

in response to a touch operation performed on the description information, displaying marking information including (i) a name of the target virtual object and (ii) position information marking a position of the target virtual object relative to the first virtual object in the scene picture of the virtual scene; and in response to the touch operation performed on the description information, transmitting the marking information to a second virtual object in the virtual scene controlled by a second terminal, the marking information including (i) the name of the target virtual object and (ii) position information marking the position of the target virtual object relative to the second virtual object in the virtual scene.

10. The electronic device according to claim 9, wherein the method further comprises:

in response to the touch operation performed on the description information, causing a display of the marking information of the target virtual object in a scene picture of the virtual scene on the second terminal.

11. The electronic device according to claim 9, wherein the method further comprises:

canceling the display of the description information when the aiming operation performed on the target virtual object stops.

12. The electronic device according to claim 9, wherein the displaying description information of the target virtual object in the scene picture comprises:

displaying the description information within a first distance from the target virtual object in the scene picture of the virtual scene.

13. The electronic device according to claim 9, wherein the marking information comprises distance prompt information, indicating a real time distance between the target virtual object and the first virtual object in the virtual scene.

14. The electronic device according to claim 9, wherein the displaying marking information of the target virtual object in the scene picture of the virtual scene comprises dynamically displaying the marking information at a position of the scene picture of the virtual scene according to a relative position of the target virtual object from the first virtual object.

15. The electronic device according to claim 9, wherein the touch operation comprises a tap operation, a double-tap operation, or a long-press operation on a touch display screen of the electronic device.

16. A non-transitory computer-readable storage medium storing at least one instruction, the at least one instruction being loadable and executable by a processor of an electronic device acting as a first terminal and causing the first terminal to implement a method including:

displaying a scene picture of a virtual scene;

detecting an aiming operation performed on a target virtual object in the scene picture of the virtual scene by a first virtual object controlled by the first terminal using an aim point of a virtual sight;

in response to a determination that a distance between a position of the aim point and a display position of the target virtual object is less than or equal to a predetermined distance, displaying description information of the target virtual object in the scene picture of the virtual scene;

in response to a touch operation performed on the description information, displaying marking information including (i) a name of the target virtual object and (ii) position information marking a position of the target virtual object relative to the first virtual object in the scene picture of the virtual scene; and in response to the touch operation performed on the description information, transmitting the marking information to a second virtual object in the virtual scene controlled by a second terminal, the marking information including (i) the name of the target virtual object and (ii) position information marking the position of the target virtual object relative to the second virtual object in the virtual scene.

17. The non-transitory computer-readable storage medium according to claim 16, wherein the method further comprises:

in response to the touch operation performed on the description information, causing a display of the marking information of the target virtual object in a scene picture of the virtual scene on the second terminal.

18. The non-transitory computer-readable storage medium according to claim 16, wherein the displaying description information of the target virtual object in the scene picture comprises:

displaying the description information within a first distance from the target virtual object in the scene picture of the virtual scene.

19. The non-transitory computer-readable storage medium according to claim 16, wherein the marking information comprises distance prompt information, indicating a real time distance between the target virtual object and the first virtual object in the virtual scene.

20. The non-transitory computer-readable storage medium according to claim 16, wherein the displaying marking information of the target virtual object in the scene picture of the virtual scene comprises dynamically displaying the marking information at a position of the scene picture of the virtual scene according to a relative position of the target virtual object from the first virtual object.

* * * * *